(12) United States Patent
Boyland

(10) Patent No.: US 12,483,638 B2
(45) Date of Patent: Nov. 25, 2025

(54) UNDERGROUND PRODUCTION DRILL COMMUNICATION SYSTEM

(71) Applicant: BCI Mining Technology Pty Ltd, Bovell (AU)

(72) Inventor: Antony Albert Phillip Boyland, Bovell (AU)

(73) Assignee: BCI Mining Technology Pty Ltd, Bovell (AU)

( * ) Notice: Subject to any disclaimer, the term of this patent is extended or adjusted under 35 U.S.C. 154(b) by 91 days.

(21) Appl. No.: 18/689,393

(22) PCT Filed: Aug. 18, 2022

(86) PCT No.: PCT/AU2022/050924
§ 371 (c)(1),
(2) Date: Mar. 5, 2024

(87) PCT Pub. No.: WO2023/028640
PCT Pub. Date: Mar. 9, 2023

(65) Prior Publication Data
US 2025/0141983 A1     May 1, 2025

(30) Foreign Application Priority Data
Sep. 6, 2021   (AU) .................. 2021902874

(51) Int. Cl.
*G06F 15/16*     (2006.01)
*G08B 7/06*      (2006.01)
(Continued)

(52) U.S. Cl.
CPC ................ *H04L 69/08* (2013.01); *G08B 7/06* (2013.01); *H04L 12/40* (2013.01); *H04L 67/12* (2013.01); *H02J 7/0068* (2013.01)

(58) Field of Classification Search
CPC ......... H04L 12/40; H04L 67/12; H04L 69/08; G08B 7/06; H02J 17/0068
(Continued)

(56) References Cited

U.S. PATENT DOCUMENTS 9,194,228 B2 * 11/2015 Hall .................... E21B 47/0232
9,587,440 B2 *  3/2017 Wang ...................... E21B 7/068
(Continued)

FOREIGN PATENT DOCUMENTS

AU     2018213983 A1    2/2019

OTHER PUBLICATIONS

"International Search Report"; prepared for application No. PCT/AU2022/050924; Oct. 27, 2022; 6 pages.

*Primary Examiner* — Moustafa M Meky
(74) *Attorney, Agent, or Firm* — Jackson Walker LLP

(57) ABSTRACT

A communication system (10) for an underground production drill (8), comprising a slave unit (12) comprising a CAN bus interface (14) and an electrical power controller (16) and rechargeable battery (18), said controller (16) configured to monitor a status and regulate charging of said battery (18). The controller (16) and battery (18) encapsulated in a thermally-conductive fire retardant material (10). The slave unit (12) includes a first protocol converter (24) and powered via the power controller (16) and configured to convert between wireless network and CAN bus protocols, and a first wireless transceiver (26) arranged in signal communication with the power controller (16) and first protocol converter (24) and configured to transceive the wireless network protocol and transmit the status of the battery (18). System (10) includes a master unit (28) comprising a CAN bus interface (14), a second protocol converter (30) and a second wireless transceiver (32).

20 Claims, 2 Drawing Sheets

(51) Int. Cl.
    *H04L 12/40*     (2006.01)
    *H04L 67/12*     (2022.01)
    *H04L 69/08*     (2022.01)
    *H02J 7/00*     (2006.01)

(58) Field of Classification Search
    USPC .......................................................... 709/200
    See application file for complete search history.

(56) References Cited

U.S. PATENT DOCUMENTS

| Patent/Pub. No. | Date | Inventor | Classification |
|---|---|---|---|
| 9,810,055 B2 * | 11/2017 | Hall | E21B 47/12 |
| 10,267,143 B2 * | 4/2019 | Hall | E21B 47/12 |
| 11,002,129 B2 * | 5/2021 | Hall | E21B 7/04 |
| 12,147,005 B2 * | 11/2024 | Hori | G01N 29/028 |
| 12,361,355 B2 * | 7/2025 | Evensen | G06Q 10/06316 |
| 2005/0002417 A1 | 1/2005 | Kelly et al. | |
| 2005/0004735 A1 | 1/2005 | Kelly et al. | |
| 2007/0096941 A1 | 5/2007 | Morys | |
| 2013/0176137 A1 * | 7/2013 | Kolpack | E21B 47/13 340/854.3 |
| 2016/0076360 A1 * | 3/2016 | Hall | E21B 47/01 340/854.6 |
| 2016/0281492 A1 * | 9/2016 | Wang | E21B 17/028 |
| 2018/0058193 A1 * | 3/2018 | Hall | E21B 44/00 |
| 2019/0234197 A1 * | 8/2019 | Hall | E21B 47/024 |
| 2021/0262338 A1 * | 8/2021 | Hall | E21B 44/00 |
| 2022/0120928 A1 * | 4/2022 | Hori | E21B 49/00 |
| 2023/0125627 A1 * | 4/2023 | Evensen | G06Q 10/06316 175/24 |

* cited by examiner

UNDERGROUND PRODUCTION DRILL COMMUNICATION SYSTEM

TECHNICAL FIELD

This invention relates to the field of underground production drills or drill solos, and more specifically to an underground production drill communication system and an associated underground production drill including such a communication system.

BACKGROUND ART

The following discussion of the background art is intended to facilitate an understanding of the present invention only. The discussion is not an acknowledgement or admission that any of the material referred to is or was part of the common general knowledge as at the priority date of the application.

Underground production drills or so-called drilling solos are well-known in the art of underground mining and generally comprise a rock drilling machine for applications ranging from service hole drilling for small-scale mine development to large-scale production stope drilling. These solos usually consist of at least one rock drill mounted on a feed system, which is supported by a boom or cradle.

As is common with large vehicles and machines, many conventional solos are controlled by means of a Controller Area Network (CAN bus), which is a robust vehicle bus standard designed to allow microcontrollers and devices to communicate with each other without a host computer. CAN bus is a message-based protocol, designed originally for multiplex electrical wiring within automobiles to save on copper, but it can also be used in many other contexts.

The CAN bus protocol prescribes a minimum two-wire bus, typically a twisted pair with a characteristic 120 Ω (nominal) impedance. The CAN bus uses differential wired-AND signals. Two signals, CAN high (CANH) and CAN low (CANL) are either driven to a 'dominant' state (with CANH>CANL), or not driven and pulled by passive resistors to a 'recessive' state (with CANH≤CANL). A dominant state generally represents a 0 data bit, while a 1 data bit encodes a recessive state, supporting a wired-AND convention. Typically, a device on a CAN bus with a lower ID number has priority on the bus. Most practical CAN bus implementations use a four-wire connection, which comprise the CAN high and CAN low, as well as positive and negative electrical connections, respectively.

The CAN bus must be terminated and termination resistors are generally needed to suppress signal reflections as well as return the bus to its recessive or idle state. High-speed CAN commonly uses a 120 Ω resistor at each end of a linear bus and low-speed CAN uses resistors at each node. A terminating bias circuit provides power and ground in addition to the CAN signalling on a four-wire cable. This provides automatic electrical bias and termination at each end of a bus segment.

Underground production drills or drilling solos typically include a drill feeder comprising a drilling arm slidably arranged on an arm support which is held stationary on a drill boom or cradle so that the drilling arm can slide forward when drilling and rearward when a drill bit is removed from a drilled hole. This drill feeder, drilling arm, arm support and cradle are conventionally actuated by means of a hydraulic system using a series of hydraulic cylinders controlled by means of solenoid valves, which are in turn controlled by means of a four-wire CAN bus.

Applicant has identified a shortcoming with such conventional underground production drill control systems, as the CAN bus cables that are required to operate the drill are difficult to protect and easily damaged or broken due to the inherently inhospitable environment in which such production drills operate.

The current invention was conceived with this shortcoming in mind.

SUMMARY OF THE INVENTION

According to a first aspect of the invention there is provided a communication system for an underground production drill, said system comprising:
  at least one slave unit comprising:
    a) a CAN bus interface;
    b) an electrical power controller and rechargeable battery, said controller configured to monitor a status and regulate charging of said battery, as well as control the provision of electrical energy from the battery to the CAN bus interface, the controller and battery encapsulated in a thermally-conductive fire retardant material;
    c) a first protocol converter arranged in signal communication with the CAN bus interface and powered via the power controller and configured to convert between wireless network and CAN bus protocols; and
    d) a first wireless transceiver arranged in signal communication with the power controller and first protocol converter and configured to transceive the wireless network protocol and transmit the status of the battery; and
  a master unit comprising:
    i) a CAN bus interface;
    ii) a second protocol converter arranged in signal communication with the CAN bus interface and configured to convert between wireless network and CAN bus protocols;
    iii) a second wireless transceiver arranged in signal communication with the second protocol converter, uniquely paired with the first wireless transceiver and configured to receive the battery status; and
    iv) an indicator configured to indicate the battery status;
wherein the master unit is retrofittably interfaceable with an existing CAN bus control system of the underground production drill and the at least one slave unit is retrofittably interfaceable with a conventional CAN bus hydraulic actuator of said drill, whereby a wireless Controller Area Network is establishable between the control system and actuators.

Typically, the slave unit and/or master unit is enclosed in a robust enclosure resistant against impact damage and/or the ingress of fluids and dirt.

In an embodiment, the enclosure includes at least one magnet for magnetically attaching to the drill.

In an embodiment, the master unit includes a power interface for interfacing with an existing power supply of the drill, said power supply for supplying the second protocol converter, transceiver and indicator.

In an embodiment, the master unit includes a second electrical power controller and rechargeable battery for supplying the second protocol converter, transceiver and indicator.

Typically, the second electrical power controller and rechargeable battery are encapsulated in a thermally-conductive fire retardant material.

In an embodiment, the battery comprises a lithium-ion battery, but variations hereon are possible and expected.

Typically, the thermally-conductive fire retardant material comprises a thermally conductive potting compound, resin and/or epoxy.

Typically, the wireless network protocol is selected from a non-exclusive group consisting of IEEE 802.11 (Wi-Fi™) and IEEE 802.15 (Bluetooth™) family of communication protocols.

Typically, the protocol converter is configured to represent a terminating bias circuit to facilitate electrical bias and termination at an end of a CAN bus segment.

Typically, the battery status is selected from a non-exclusive group consisting of battery charge level, battery health, battery discharge rate and battery temperature.

Typically, the indicator is selected from a non-exclusive group consisting of a visual indicator, such as a display, and LED, or the like, and an audible indicator, such as a speaker, or the like.

According to a second aspect of the invention there is provided an underground production drill including:

at least one slave unit comprising:
 a) a CAN bus interface;
 b) an electrical power controller and rechargeable battery, said controller configured to monitor a status and regulate charging of said battery, as well as control the provision of electrical energy from the battery to the CAN bus interface, the controller and battery encapsulated in a thermally-conductive fire retardant material;
 c) a first protocol converter arranged in signal communication with the CAN bus interface and powered via the power controller and configured to convert between wireless network and CAN bus protocols; and
 d) a first wireless transceiver arranged in signal communication with the power controller and first protocol converter and configured to transceive the wireless network protocol and transmit the status of the battery; and a master unit comprising:
 i) a CAN bus interface;
 ii) a second protocol converter arranged in signal communication with the CAN bus interface and configured to convert between wireless network and CAN bus protocols;
 iii) a second wireless transceiver arranged in signal communication with the second protocol converter, uniquely paired with the first wireless transceiver and configured to receive the battery status; and
 iv) an indicator configured to indicate the battery status;

wherein the master unit is interfaced with an existing CAN bus control system of the underground production drill and the at least one slave unit is interfaced with at least one existing CAN bus hydraulic actuator of said drill, whereby a wireless Controller Area Network is establishable between the control system and actuators.

Typically, the slave unit and/or master unit is enclosed in a robust enclosure resistant against impact damage and/or the ingress of fluids and dirt.

In an embodiment, the enclosure includes at least one magnet for magnetically attaching to the drill.

In an embodiment, the master unit includes a power interface for interfacing with an existing power supply of the drill, said power supply for supplying the second protocol converter, transceiver and indicator.

In an embodiment, the master unit includes a second electrical power controller and rechargeable battery for supplying the second protocol converter, transceiver and indicator.

Typically, the second electrical power controller and rechargeable battery are encapsulated in a thermally-conductive fire retardant material.

In an embodiment, the battery comprises a lithium-ion battery, but variations hereon are possible and expected.

Typically, the thermally-conductive fire retardant material comprises a thermally conductive potting compound, resin and/or epoxy.

Typically, the wireless network protocol is selected from a non-exclusive group consisting of IEEE 802.11 (Wi-Fi™) and IEEE 802.15 (Bluetooth™) family of communication protocols.

Typically, the protocol converter is configured to represent a terminating bias circuit to facilitate electrical bias and termination at an end of a CAN bus segment.

Typically, the battery status is selected from a non-exclusive group consisting of battery charge level, battery health, battery discharge rate and battery temperature.

Typically, the indicator is selected from a non-exclusive group consisting of a visual indicator, such as a display, and LED, or the like, and an audible indicator, such as a speaker, or the like.

According to a third aspect of the invention there is provided a kit for retrofitting an underground production drill, said kit comprising the communication system in accordance with the first aspect of the invention.

According to a yet further aspect of the invention there is provided a communication system for an underground production drill and an underground production drill, substantially as herein described and/or illustrated.

BRIEF DESCRIPTION OF THE DRAWINGS

The description will be made with reference to the accompanying drawings in which.

DETAILED DESCRIPTION OF EMBODIMENTS

Figure 1:
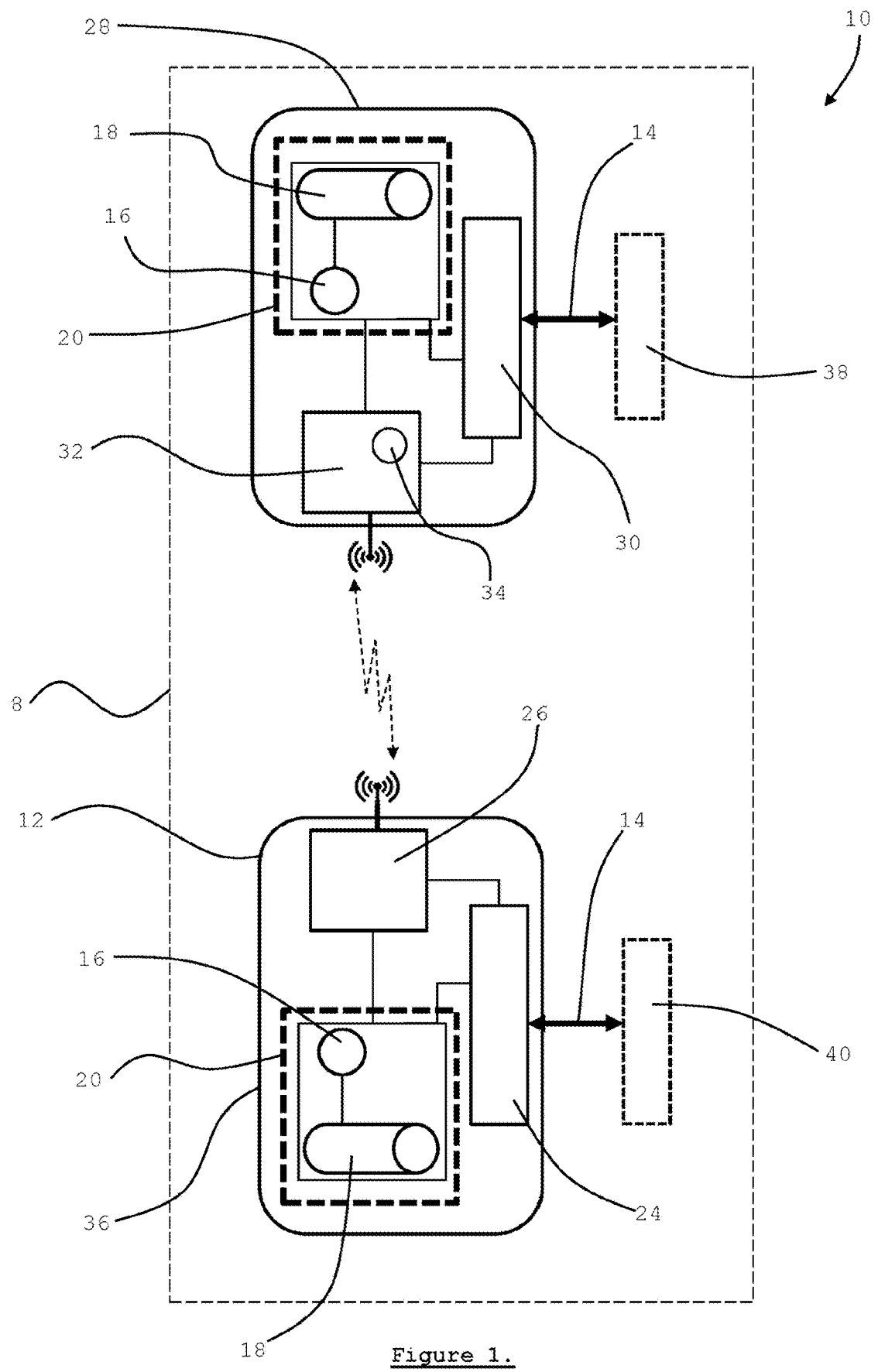
FIG. 1 is a diagrammatic representation of one embodiment of a communication system for an underground production drill, in accordance with aspects of the present invention.
Figure 2:
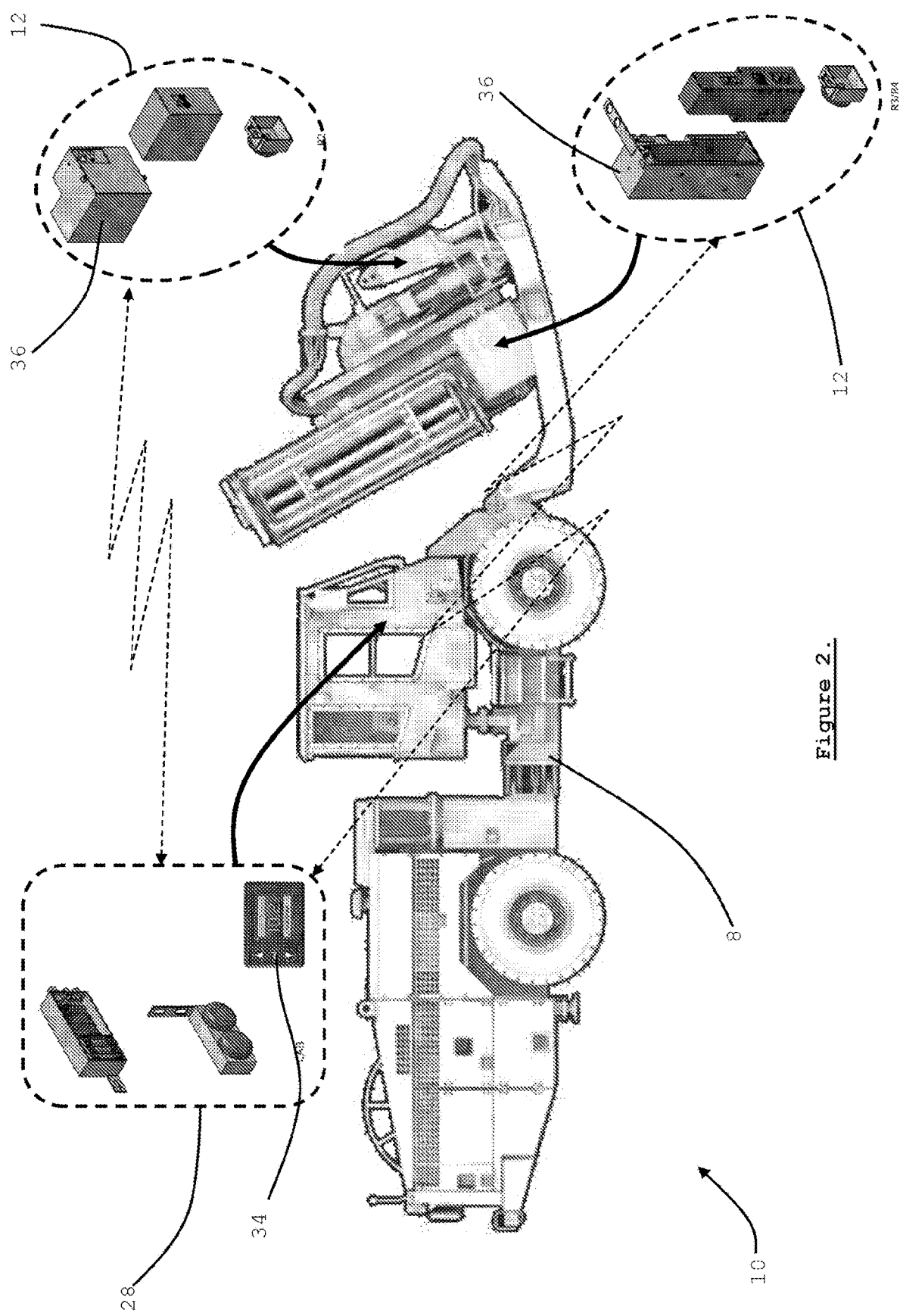
FIG. 2 is a diagrammatic representation of an underground production drill including a communication system, in accordance with aspects of the present invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

With reference now to the accompanying figures, there is broadly exemplified an embodiment of a communication system 10 for an underground production drill 8. As is known in the art, such an underground production drill 8 typically includes a drill feeder comprising a drilling arm slidably arranged on an arm support which is held stationary on a drill boom so that the drilling arm is able to slide forward when drilling and rearward when a drill bit is removed from a drilled hole.

The system 10 finds particular application in retrofitting such an existing drill 8 making use of a conventional wired CAN bus to remove physical CAN bus wiring and cables and establish an ad hoc wireless CAN bus communication system between an existing control system 38 of the drill 8 and existing conventional CAN bus actuators 40, such as hydraulic cylinder actuators or the like, to allow the drill 8 to operate as normal, but without physical wiring leading to the drill feeder, drilling arm, arm support and/or drill boom etc. that may be damaged during general use of the drill 8. Broadly, the communication system 10 comprises at least one slave unit 12 and a master unit 28, as described below.

In a typical embodiment, system 10 includes at least one slave unit 12 which comprises a CAN bus interface 14, and an electrical power controller 16 and rechargeable battery 18. The controller 18 is configured to monitor a status and regulate charging of the battery 18, as well as control the provision of electrical energy from the battery 18 to the CAN bus interface 14. The controller 16 and battery 18 are generally encapsulated in a thermally-conductive fire retardant material 20.

The slave unit 12 also includes a first protocol converter 24 which is arranged in signal communication with the CAN bus interface 14 and is powered via the power controller 16 and is configured to convert between wireless network and CAN bus protocols. Slave unit 12 also includes a first wireless transceiver 26 which is arranged in signal communication with the power controller 16 and first protocol converter 24 and is configured to transceive the wireless network protocol and transmit the status of the battery 18, as monitored by the power controller 16.

System 10 further typically includes a master unit 28 which comprises a CAN bus interface 14, and a second protocol converter 30 which is arranged in signal communication with the CAN bus interface 14 of the master unit 28 and is configured to convert between wireless network and CAN bus protocols. Master unit 28 also includes a second wireless transceiver 32 which is arranged in signal communication with the second protocol converter 30, the second wireless transceiver 32 uniquely paired with the first wireless transceiver 26 when the system 10 is in use. The second wireless transceiver 32 is also configured to receive the battery status as transmitted by the first wireless transceiver 26. Master unit 28 further includes an indicator 34 which is configured to indicate the battery status.

In this manner, the master unit 28 is retrofittably interfaceable with an existing CAN bus control system 38 of the underground production drill 8 and the at least one slave unit 12 is retrofittably interfaceable with an existing conventional CAN bus actuator 40 of the drill, such as a hydraulic actuator, so that an ad hoc wireless Controller Area Network is establishable between the control system 38 and actuators 40 of the drill 8.

The slave unit 12 and/or master unit 28 is typically enclosed in a robust enclosure 36 which is resistant against impact damage and/or the ingress of fluids and dirt. In one embodiment, the enclosure 36 includes at least one magnet, such as a rare earth magnet, for magnetically attaching to the drill 8, or the like. Of course, variations hereon are possible and expected.

In one embodiment, the master unit 28 includes a power interface for interfacing with an existing power supply of the drill 8, so that the second protocol converter 30, transceiver 32 and indicator 34 are powered by an on-board power system of the drill 8. Alternatively, or additionally, in one embodiment, the master unit 28 includes a second electrical power controller 16 and rechargeable battery 18, similar to the slave unit 12, for supplying the second protocol converter 30, transceiver 32 and indicator 34. Similarly, this second electrical power controller 16 and rechargeable battery 18 are encapsulated in a thermally-conductive fire retardant material 20.

The battery 18 used in the slave and/or master units 12 and 28 generally comprises a lithium-ion battery, but variations hereon are possible and expected. Typically, the thermally-conductive fire retardant material 20 comprises a thermally conductive potting compound, resin and/or epoxy. Such encapsulation of the battery 18 and power controller 16 is a safety measure and prevents damage to the battery 18 and controller 16.

The wireless network protocol to which the protocol converters 24 and 30 convert the CAN bus protocols used by the existing drill control system 38 is typically selected from the IEEE 802.11 (Wi-Fi™) and/or IEEE 802.15 (Bluetooth™) family of communication protocols. However, variations hereon are possible and included within the scope of the present invention.

Additionally, to comply with CAN bus termination standards, the protocol converters 24 and 30 are typically configured to represent a terminating bias circuit to facilitate electrical bias and termination at an end of a CAN bus segment.

The power controller 16 monitors the battery status, including battery charge level, battery health, battery discharge rate and battery temperature, and this status can be transmitted from a slave unit 12 for display on the indicator 34 of the master unit 28. Such an indicator 34 may take a variety of forms, including a visual indicator, such as a display, and LED, or the like, an audible indicator, such as a speaker, or the like.

Applicant believes it particularly advantageous that the present invention provides for a system 10 whereby an existing CAN bus wired system of an underground production drill 8 can be replaced or retrofitted with damage-resistant slave and master units 12 and 28, as required, so that an ad hoc wireless communication system 10 is established without any disruption to an existing CAN bus control system 38 of the drill 8. The slave and master units 12 and 28 are hardened to withstand damage, with power supplied encapsulated in thermally-conductive fire retardant material 20. The slave and master units 12 and 28 also terminate the conventional wired CAN bus to facilitate seamless integration into the existing CAN bus control system 38 of the drill 8.

The skilled addressee will appreciate that the present invention includes a production drill 8 fitted with such a system 10, as described herein.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. A communication system for an underground production drill, said system comprising:
   at least one slave unit comprising:
   a) a CAN bus interface;
   b) an electrical power controller and rechargeable battery, said controller configured to monitor a status and regulate charging of said battery, as well as control the provision of electrical energy from the battery to the CAN bus interface, the controller and battery encapsulated in a thermally-conductive fire-retardant material;
   c) a first protocol converter arranged in signal communication with the CAN bus interface and powered via the power controller and configured to convert between wireless network and CAN bus protocols, the protocol converter configured to represent a terminating bias circuit to facilitate electrical bias and termination at an end of a CAN bus segment; and
   d) a first wireless transceiver arranged in signal communication with the power controller and first protocol converter and configured to transceive the wireless network protocol and transmit the status of the battery; and
   a master unit comprising:
   i) a CAN bus interface;
   ii) a second protocol converter arranged in signal communication with the CAN bus interface and configured to convert between wireless network and CAN bus protocols;
   iii) a second wireless transceiver arranged in signal communication with the second protocol converter, uniquely paired with the first wireless transceiver and configured to receive the battery status; and
   iv) an indicator configured to indicate the battery status;
   wherein the master unit is retrofittably interfaceable with an existing CAN bus control system of the underground production drill and the at least one slave unit is retrofittably interfaceable with a conventional CAN bus hydraulic actuator of said drill, whereby a wireless Controller Area Network is establishable between the control system and actuators.

2. The system of claim 1, wherein the slave unit and/or master unit is enclosed in a robust enclosure resistant against impact damage and/or the ingress of fluids and dirt.

3. The system of claim 2, wherein the enclosure includes at least one magnet for magnetically attaching to the drill.

4. The system of claim 1, wherein the master unit includes a power interface for interfacing with an existing power supply of the drill, said power supply for supplying the second protocol converter, transceiver and indicator.

5. The system of claim 1, wherein the master unit includes a second electrical power controller and rechargeable battery for supplying the second protocol converter, transceiver and indicator.

6. The system of claim 5, wherein the second electrical power controller and rechargeable battery are encapsulated in a thermally-conductive fire-retardant material.

7. The system of claim 6, wherein the thermally-conductive fire-retardant material comprises a thermally conductive potting compound, resin and/or epoxy.

8. The system of claim 1, wherein the wireless network protocol is selected from a non-exclusive group consisting of IEEE 802.11 (Wi-Fi™) and IEEE 802.15 (Bluetooth™) family of communication protocols.

9. The system of claim 1, wherein the battery status is selected from a non-exclusive group consisting of battery charge level, battery health, battery discharge rate and battery temperature.

10. The system of claim 1, wherein the indicator includes a visual indicator and/or an audible indicator.

11. An underground production drill including:
    at least one slave unit comprising:
    a) a CAN bus interface;
    b) an electrical power controller and rechargeable battery, said controller configured to monitor a status and regulate charging of said battery, as well as control the provision of electrical energy from the battery to the CAN bus interface, the controller and battery encapsulated in a thermally-conductive fire-retardant material;
    c) a first protocol converter arranged in signal communication with the CAN bus interface and powered via the power controller and configured to convert between wireless network and CAN bus protocols, the protocol converter configured to represent a terminating bias circuit to facilitate electrical bias and termination at an end of a CAN bus segment; and d) a first wireless transceiver arranged in signal communication with the power controller and first protocol converter and configured to transceive the wireless network protocol and transmit the status of the battery; and a master unit comprising:
i) a CAN bus interface;
ii) a second protocol converter arranged in signal communication with the CAN bus interface and configured to convert between wireless network and CAN bus protocols;
iii) a second wireless transceiver arranged in signal communication with the second protocol converter, uniquely paired with the first wireless transceiver and configured to receive the battery status; and
iv) an indicator configured to indicate the battery status;

wherein the master unit is interfaced with an existing CAN bus control system of the underground production drill and the at least one slave unit is interfaced with at least one existing CAN bus hydraulic actuator of said drill, whereby a wireless Controller Area Network is establishable between the control system and actuators.

12. The underground production drill of claim 11, wherein the slave unit and/or master unit is enclosed in a robust enclosure resistant against impact damage and/or the ingress of fluids and dirt.

13. The underground production drill of claim 12, wherein the enclosure includes at least one magnet for magnetically attaching to the drill.

14. The underground production drill of claim 11, wherein the master unit includes a power interface for interfacing with an existing power supply of the drill, said power supply for supplying the second protocol converter, transceiver and indicator.

15. The underground production drill of claim 11, wherein the master unit includes a second electrical power controller and rechargeable battery for supplying the second protocol converter, transceiver and indicator.

16. The underground production drill of claim 15, wherein the second electrical power controller and rechargeable battery are encapsulated in a thermally-conductive fire-retardant material.

17. The underground production drill of claim 16, wherein the thermally-conductive fire-retardant material comprises a thermally conductive potting compound, resin and/or epoxy.

18. The underground production drill of claim 11, wherein the wireless network protocol is selected from a non-exclusive group consisting of IEEE 802.11 (Wi-Fi™) and IEEE 802.15 (Bluetooth™) family of communication protocols.

19. The underground production drill of claim 11, wherein the battery status is selected from a non-exclusive group consisting of battery charge level, battery health, battery discharge rate and battery temperature.

20. The underground production drill of claim 11, wherein the indicator includes a visual indicator and/or an audible indicator.

* * * * *